July 6, 1954  G. M. BOOTH  2,683,079
APPARATUS FOR PREPARING GASEOUS PRODUCTS
Filed Nov. 26, 1948  4 Sheets-Sheet 1

July 6, 1954  G. M. BOOTH  2,683,079
APPARATUS FOR PREPARING GASEOUS PRODUCTS
Filed Nov. 26, 1948  4 Sheets-Sheet 2

INVENTOR.
George M. Booth
BY
Robert S. Dunham
ATTORNEY

July 6, 1954  G. M. BOOTH  2,683,079
APPARATUS FOR PREPARING GASEOUS PRODUCTS
Filed Nov. 26, 1948  4 Sheets-Sheet 3
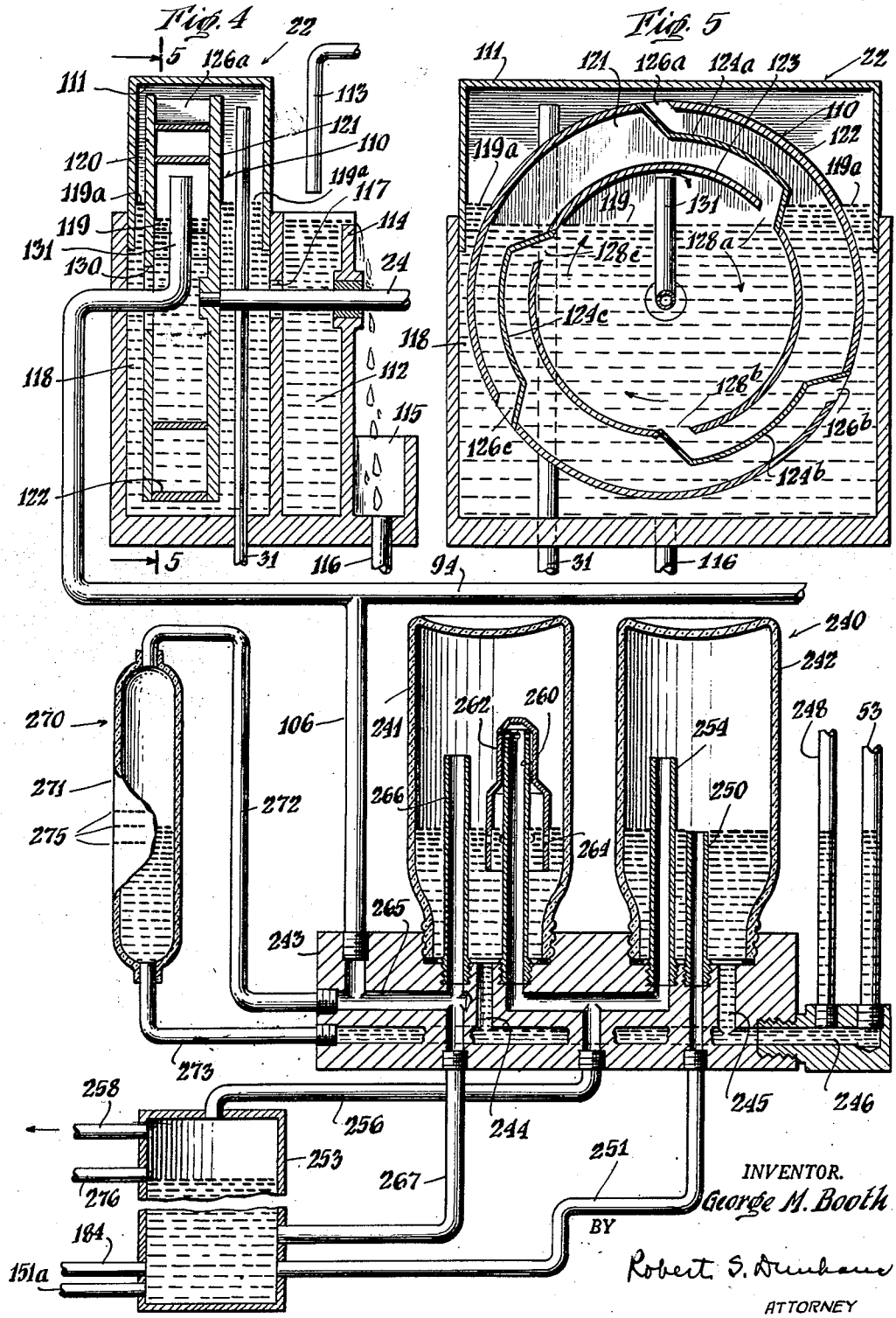
INVENTOR.
George M. Booth
BY
Robert S. Dunham
ATTORNEY July 6, 1954  G. M. BOOTH  2,683,079
APPARATUS FOR PREPARING GASEOUS PRODUCTS
Filed Nov. 26, 1948  4 Sheets-Sheet 4
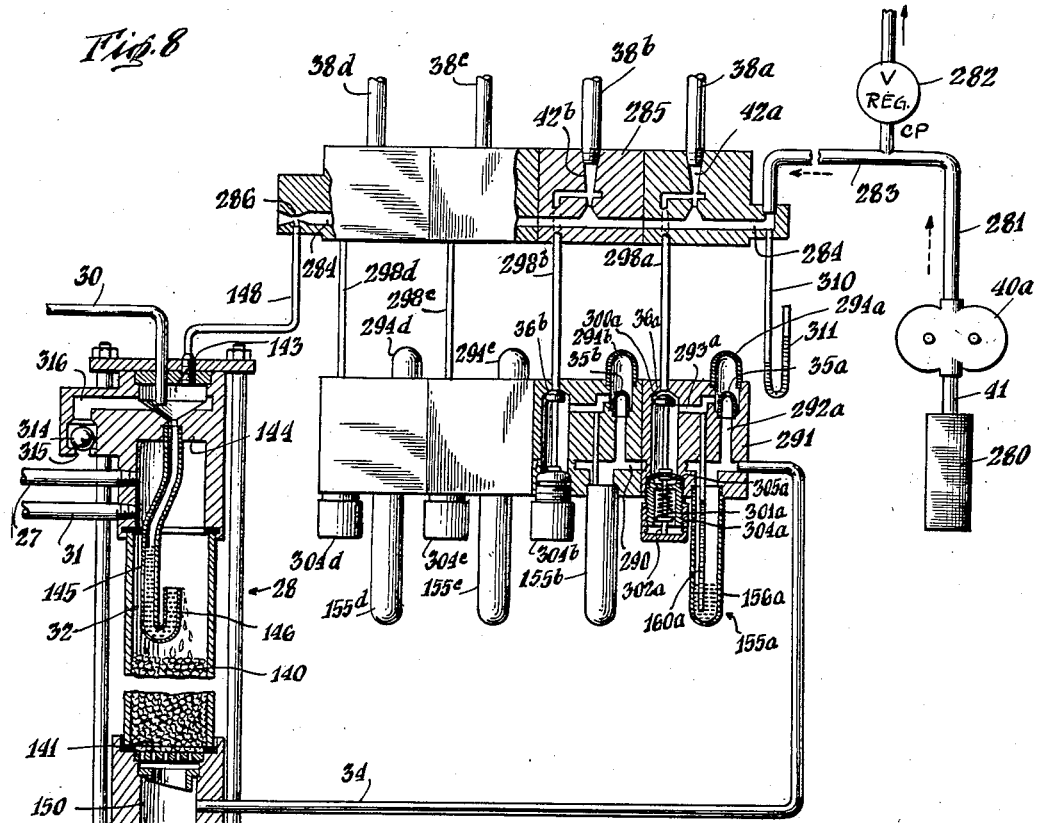
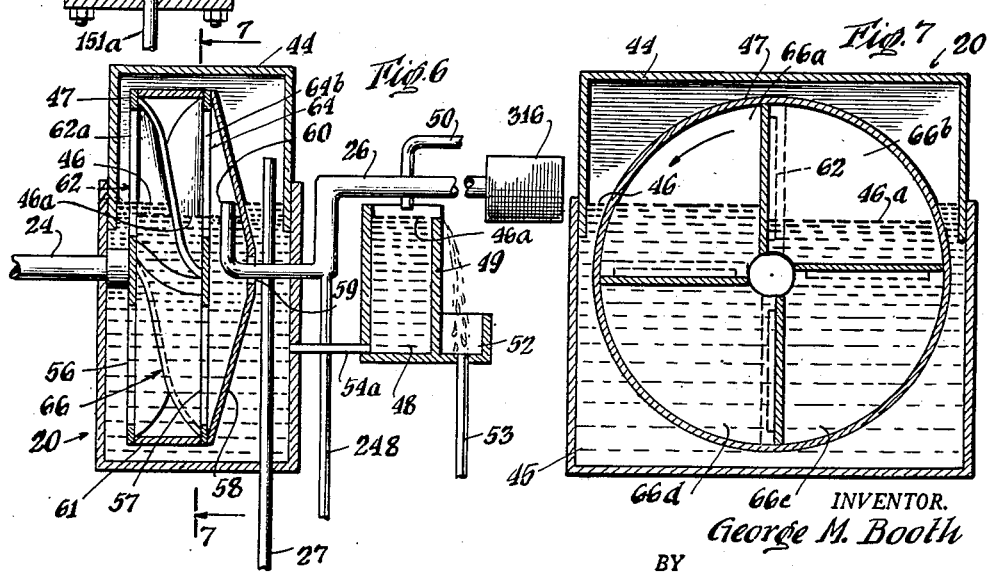
INVENTOR.
George M. Booth
BY
Robert S. Dunham
ATTORNEY Patented July 6, 1954

2,683,079

UNITED STATES PATENT OFFICE 2,683,079

APPARATUS FOR PREPARING GASEOUS PRODUCTS

George M. Booth, Westfield, N. J., assignor to Wallace & Tiernan Incorporated, a corporation of Delaware Application November 26, 1948, Serial No. 61,936

20 Claims. (Cl. 23—252)

This invention relates to the preparation of gaseous products, especially by procedure involving the admixture or at least the feeding of a plurality of fluids in predetermined proportions. The invention embraces novel and effective apparatus for carrying out such operations, particularly for proportioning the constituent or reactant fluids in a highly accurate manner, so that the ultimate gaseous product has uniformity of composition in all desired respects. Complete embodiments of the apparatus, appropriate for operations involving chemical reaction between certain of the supplied materials, may include instrumentalities to feed the constituent or reactant materials in an effectively continuous manner and in desired quantitative relationship to each other, means providing a reaction or mixing zone, and means for withdrawing and metering the ultimate product, with provision, if desired, for distributing the latter in a plurality of separately controllable channels.

In one very important aspect, the invention relates to the manufacture of a gaseous product comprising chlorine dioxide in admixture with diluent gas, the product being discharged continuously and in a form suitable for application for a variety of industrial and other uses. Chlorine dioxide is an energetic oxidizing agent, existing as a gas under the conditions at which it is customarily employed. In concentrated form it has a tendency to decompose, often explosively, unless great care is exercised. However, when it is highly diluted with air or other suitably inert gas such as carbon dioxide or nitrogen, it becomes entirely safe to handle; a mixture containing air as a principal diluent and having a chlorine dioxide content, for example, of less than 10% by volume has been found to be free from danger of explosion and may be distributed and used with complete safety. Since it is uneconomical to attempt transportation or storage of the dilute mixtures, it is preferable to produce the chlorine dioxide (with suitable dilution) at the locality of its use, and only in the quantity or at the rate immediately required for such use; waste is thus avoided, and likewise any necessity for storing or packaging the gas.

One method of making chlorine dioxide, to which the present invention is particularly applicable, involves the reaction of chlorine gas with sodium chlorite, the latter being advantageously employed in the form of an aqueous solution. This treatment yields chlorine dioxide, which may be separated in gaseous form, leaving a solution of sodium chloride as the other product of the reaction.

Bearing in mind the extreme desirability of keeping diluent gas in admixture with the chlorine dioxide for purposes of safety as well as for convenience of feed and distribution in many uses of the product, the system of the invention is designed to insure the maintenance of a completely sufficient supply of air or other diluent at all times, and at least as soon as needed. Indeed a further and paramount object is to provide apparatus wherein air or the like is automatically fed to the reaction zone along with one or more of the reactants, so as to make certain that the desired, and usually large proportion of air is always present before the reaction occurs. Other objects are to provide novel and particularly efficient apparatus for carrying out the described reaction and for supplying and maintaining the desired quantity of air in the manner stated above.

Another and more specific object of the invention is to afford an extremely accurate dilution of the active gaseous ingredient, e. g. chlorine dioxide, so that the control and measurement of the final dilute product may be usefully achieved by volumetric means, such volumetric determination of the ultimate product then affording an accurate measure of the active ingredient which is present in only a very small concentration.

Further objects of importance are: to provide apparatus wherein any failure of the flow of a selected ingredient, such as air or other diluent, positively prevents the flow of other substances to the preparation zone; and to provide such apparatus wherein any diminution of flow of the selected ingredient infallibly produces a corresponding diminution of the supply of the other materials.

It will be appreciated that the improved apparatus may be employed for other purposes than the production of chlorine dioxide, and indeed is of special advantage in any process where the desired, active product is a gas that is unstable and hazardous unless diluted with air or the like. Under such circumstances, the apparatus is adapted to serve objects identical with, or correspondingly equivalent to, those recited above. Thus the present improvements are especially useful in procedures where the proportion of fluid ingredients (such as gases or liquids or both) is so important that it is desirable to control their supply by volumetric instrumentalities rather than with orifices or throttling devices. The apparatus herein disclosed is also of value in other chemical operations where the failure of flow of one reactant makes it imperative, or at least highly desirable, to interrupt the flow of one or more other materials.

Still further objects are to provide apparatus of the character stated wherein the continuous output of diluted chlorine dioxide or other gaseous product may be accurately divided into a plurality of streams, e. g. preferably several streams which can be independently controlled without appreciably affecting the flow of the others; to provide such equipment wherein the proper operation of the several instrumentalities may be readily checked upon quick visual observation by an unskilled operator; to provide apparatus of the character stated wherein chlorine gas may be handled with complete safety in its customary commercial form, i. e. as furnished in liquefied state in steel cylinders; and to provide, in apparatus of the character stated, a metering and flow controlling set of instrumentalities which are adapted to maintain their reliability, despite the use of ingredients or the presence of conditions which might be likely to plug or otherwise impair an orifice type of flow-controlling device.

A still further object is to provide, especially in apparatus of the described character, suitable means whereby accurately controlled aqueous solutions of sodium chlorite or the like may be prepared in an effectively fool-proof manner, i. e. so as to minimize, for instance, the normal hazards of handling sodium chlorite. This material, usually supplied in the form of a rather finely divided solid, e. g. flaked crystals, is apt to cause fire or other undesired reaction when subjected to mechanical pressure or heat while it (the solid chlorite) is in contact with oxidizable material.

The invention is also, in itself designed to afford improved, simpler and more economical apparatus and procedure for making chlorine dioxide, as by reaction of the sort mentioned above, or by other reactions, of which one example is that involved in the treatment of sodium chlorate solution with sulfuric acid, usually in the presence of dissolved sodium chloride.

To these and other ends, including additional objects such as may become apparent or are incidental to the use of the disclosed features of improvement, a presently preferred embodiment of the invention is described below and shown in the accompanying drawings, i. e. by way of illustrative example.

Referring to the drawings:

Fig. 4 is a view, chiefly in vertical section, of certain gas feeding and controlling instrumentalities preferably to be embodied in the system of Fig. 1;

Fig. 5 is a vertical section of the chlorine gas metering device, taken on line 5—5 of Fig. 4;

Fig. 6 is a vertical section, essentially in the plane of the drive shaft axis, of an air-metering motor embodied in the system of Fig. 1;

Fig. 7 is a section on line 7—7 of Fig. 6; and

Fig. 8 is a view, chiefly in vertical section, but partly in elevation, of the preparation chamber and certain flow indicating and distributing parts preferably to be embodied in the system of Fig. 1.

In accordance with the more important and specific objects set forth above, the illustrated embodiment of the invention is an apparatus for continuously generating and delivering, through a plurality of individually controllable discharge elements, a safely-diluted flow of chlorine dioxide gas. For this and like purposes, an outstanding, specific concept of the invention resides in the provision of multiple fluid supply means which simultaneously meter the flow of several constituent or reactant fluids to a preparation zone and which involve parts so inter-related that the supply of certain of the fluids is entirely dependent on the simultaneous supply of another of them, e. g. air or other diluent gas.

More particularly the system shown involves a novel and peculiarly advantageous combination of instrumentalities, viz. a metering-type motor which is actuated by the flowing air (or the like) and which in turn governs, by a direct driving or similar connection, appropriate metering devices for the other fluids, each of the last-mentioned devices being selected to afford a flow of the corresponding fluid which will occur only when the entire connected system is positively operated by the air motor, and which will be strictly proportional to the rate of such operation. For realization of certain special and unusual advantages, the selected air motor is of a rotary type, adapted to turn a drive shaft substantially continuously and at a rate directly proportional to the volume of air traversing the motor. With similar effect, the subservient metering devices are likewise of rotary type, including structure directly turned by the motor drive shaft, whereby true proportionality and dependence of the fluid supplies is achieved, relative to the operation of the air motor.

The apparatus, in its complete embodiment, also comprises means constituting a preparation zone, for simultaneously receiving the reactant fluids and the diluent air or other gas, for effectuating the desired mixture and treatment, and for yielding separate discharge of the gaseous product and of the spent liquid. In combination with the foregoing, a plurality of cooperating means are likewise preferably included, for effectuating supply of reactant liquid and gas to the metering devices, for indicating characteristics of such supply, for providing certain safety or relief operations upon abnormality in the supply system, and for control, indication and distribution of separate streams of the gaseous product, in a manner consonant with the nature and function of the other or basic instrumentalities.

Figure 1:
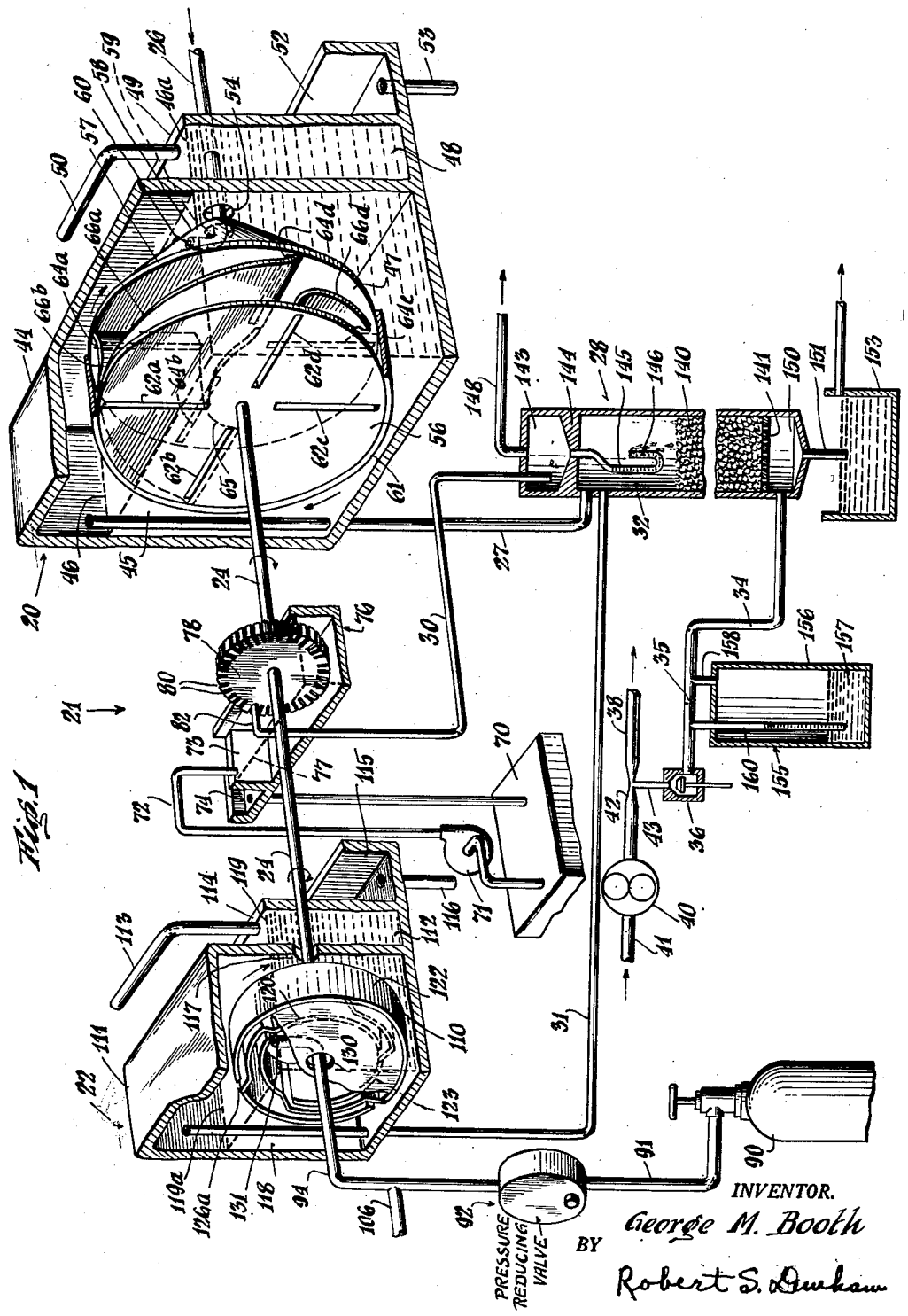
Fig. 1 is a chiefly diagrammatic view, showing certain parts in perspective but with forward wall structures broken away, of a fluid-proportioning, gas-generating system embodying important features of the invention.

Referring now to Fig. 1 of the drawings, the illustrated system includes a metering-type air motor generally designated 20, a solution metering and advancing device 21 and a metering device 22 for chlorine gas, the devices 21 and 22 being directly connected to and operated by the drive or power shaft 24 of the air motor 20. The conduit structure for the air supply in which the air motor is connected, includes an air inlet pipe 26 leading to the motor and a transfer pipe 27 leading from the motor to the preparation zone, viz. a reaction tower generally designated 28. For use in the desired reaction to generate chlorine dioxide, sodium chlorite solution is supplied by the device 21 through a pipe 30 leading to the tower 28, and chlorine gas is delivered from the device 22 by a pipe 31, the air and chlorine pipes 27 and 31 opening directly into the top of the main reaction chamber 32 of the tower 28.

The gaseous product, comprising chlorine dioxide highly diluted with air, is delivered at the bottom of the tower to a discharge pipe 34 which includes a metering orifice 35 and further discharge conduit structure having a throttling-type control valve 36 and an ultimate delivery pipe generally designated 38. For simplicity, only one such orifice and discharge assembly is shown in Fig. 1. To withdraw the gaseous product and also to advance air through the conduit structure including the air motor 20 a suitable air pumping device generally designated 40 is provided, forcing air from an inlet 41 through a Venturi-type air aspirator 42, the latter having a suction connection 43 which constitutes part of the gas product delivery conduit and which actually draws the air and gas through the various supply instrumentalities, e. g. by directly imparting energy to the air stream for actuation of the motor 20.

For response of the apparatus in truly volumetric proportion to the flow of diluent gas (i. e. air), the motor 20 consists essentially of a type of structure heretofore known for other purposes as a wet gas meter. This device comprises a housing 44 (see also Figs. 6 and 7) containing water 45 up to a level 46 above the shaft 24, and enclosing a rotating wheel or drum 47 that drives the shaft 24, upon which the wheel is mounted, the shaft being disposed on a horizontal axis.

Governed by the pressure drop across the motor, which varies from zero at zero flow to a conveniently small maximum at the greatest flow, the level 46 ranges from equality with, to a point about one inch above, a controlling, predetermined water level 46a maintained by an external, constant level chamber 48 which communicates with the interior of the box 44 below the surface of the water and which has an overflow wall 49. Water is continuously supplied to the chamber 48 through a pipe 50 and constantly overflows the wall 49 into a discharge chamber 52, from which it is drained by a pipe 53 at the bottom. The constant level chamber 48 may be disposed against the housing 44 (as in Fig. 1), communicating therein through clearance space in a hole 54 through which the air inlet conduit 26 enters the case 44; or as shown in Fig. 6, the chamber 48 may be spaced from the container 44, but connected thereto by a pipe 54a.

The transfer pipe 27 for outlet of air from the motor opens inside the housing 44, but well above the liquid level 46 and externally of the drum 47. As shown in Figs. 1, 6 and 7, the drum has an end wall or face 56, another parallel wall or partition 57 spaced axially of the drum, and an outer and generally frusto-conical wall or face 58 peripherally secured to the wall 57. The air inlet pipe 26 extends through an opening 59 at the center of the wall 58, and turns upwardly at 60, to open in the compartment between walls 57 and 58, but above the level 46a of the water, the water communicating with the interior of the drum by the hole 59, which has sufficient clearance around the pipe 26. The drum has an outer, cylindrical wall 61 connecting the peripheries of the walls 56, 57 so as to constitute with the latter a flat cylindrical enclosure disposed coaxially with the shaft 24 upon which it is mounted and supported. The wall 56 has a plurality of radial slots, for example four at equal angular spacings, generally designated 62 and distinguished as 62a, 62b, 62c and 62d, and the wall 57 has like slots 64 (identified as 64a, 64b, 64c and 64d), disposed similarly, and conveniently opposite the slots 62a–62d.

A plurality of partitions 66, viz. 66a, 66b, 66c and 66d, equal in number to the slots in either wall, extend helically within this annular space, from a locality below the water level (e. g. near the axis of the wheel) to the outer sheath 61 and from the inner face of the wall 56 to the opposite, inner face of the wall 57. More specifically, each of these partitions extends from one side of a slot 62, to the relatively opposite side of the slot 64, which is angularly spaced by 90° from the first-mentioned slot 62. Thus the partition 66a extends from one side of slot 62a, past the latter and to the far side, so to speak, of the slot 64d. Similarly the partion 66d extends from a part of the face 56 along the slot 62d, past the slot, and to the far side of the slot 64c. In consequence a curved, helically shaped chamber is provided, bounded by the partitions 66a, 66d and the quadrant-shaped portions of the walls 56, 57, such chamber having an angular extent of approximately 180° around the axis. The radially inside edges of the partitions may be slightly spaced, i. e. in that the helical chamber need not be internally closed at its part, nearest the axis, which is always submerged. Similar chambers are provided between other successive partitions around the drum, each identical with the one specifically described.

The partitioned structure is adapted to effect rotation of the wheel or drum, upon establishment of air (or gas) flow in the conduit structure 26—27, such flow being induced either by increasing the pressure at the inlet end or by decreasing it at the outlet end 27. The rotation of the wheel is produced by the buoyant effect of the air traversing it, causing it to turn in a clockwise direction as seen in Fig. 1, or counterclockwise as seen in Fig. 7. More specifically, air entering the cone-shaped chamber within the wall 58, passes through the particular slot 64 which is exposed above the surface of the water 46a, into the helical chamber, which opens at its other end through the slot 62 that is spaced 180° from the exposed slot 64. Since the buoyant effect of the air is such that it continuously endeavors to fill a larger space (the entering air being at a higher pressure than that outside the drum in the chamber 44), the air effects a relative movement between the water and the walls of the described chamber, in a sense to draw the chamber out of the water, around the axis of the shaft. While this operation is progressing, air previously caught in a chamber ahead, so to speak, of the one just considered, is discharged through the slot 62 that is simultaneously exposed above the water level 46, such discharge of air and the accompanying force tending to move the drum relative to the water (in the same clockwise direction, as seen in Fig. 1) being promoted by the lower pressure of the air in the space outside the drum.

In consequence the drum is caused to rotate by the buoyant effect of the air filling successive helical chambers through the slots 64 and thereafter discharging from such chambers through the slots 62. The rate of rotation is directly proportional to the volume of air forced through the device per unit of time, the proportionality being extremely accurate.

As stated, the actual advance of air through the metering motor 20 is effected by the propelling instrumentalities which are indicated at 40, 42, in the gas flow conduit structure beyond the device, and which thus provide the energy to actuate it, both for its driving and metering purposes. If the operation of the pump 40 or the aspirator 42 is interrupted or if the conduit structure between these devices and the motor is closed, the motor stops. Likewise, if the flow of air is throttled down as by the valve 36, the rate of rotation of the motor decreases, in true proportion to the change in rate of flow, i. e. to a value corresponding with the lesser volume of air traversing the conduit structure per unit of time.

For the intended chemical reaction sodium chlorite solution is fed through the line 30 to the tower 28 at a rate proportioned to the supply of air and likewise to the supply of the other reactant fluid, viz. chlorine gas, by means of the metering and pumping device 21. The chlorite solution feeding system is shown in simplified form in Fig. 1, and includes a tank 70 from which the solution is drawn, as by a pump 71. The feed structure also includes constant level means here shown, for simplicity, as a level-determining wall 73 over which the excess of the solution fed by the pump through a pipe 72 continuously overflows into an associated overflow chamber 74 from which such excess solution may return to the tank 70. A vessel 76, of which the wall 73 constitutes one side, is thus kept filled to a constant level 77 by the chlorite solution supplied through the pipe 72. A wheel 78 mounted on the shaft 24, to be rotated thereby, is disposed so that its lower part, below the shaft, is submerged in the chlorite solution in the vessel 76. The periphery of the wheel 78, which has the shape of a disk of substantial thickness, is provided with a multiplicity of regularly and closely spaced slots or saw-cuts 80, each extending radially inward for a short distance from the circumference of the wheel.

A take-off tube or pipe 82 extends above the level 77 of the solution in the vessel 76, and communicates with the solution feed line 30, constituting the inlet end of the latter, to which suction is continuously applied by means described below. The take-off tube 82 has an open end closely adjacent to a side face of the wheel 78, the end of the tube being preferably disposed so that it barely fails to touch the surface of the wheel. Specifically, the end opening of the tube is so located that the sides of the grooves 80 sweep past it as the wheel turns (see also Fig. 3).

As the wheel 78 rotates, its successive solts 80 dip into the solution, and on rising from the latter toward the tube 82, remain filled with liquid, by capillary attraction. As they successively pass the open end of the tube, the latter then, by virtue of the applied vacuum, withdraws the liquid so retained, i. e. directly sucks it out for passage down the pipe 30. In consequence, successive small slugs of solution are fed through the pipe 30 to the top of the tower, at a rate which is volumetrically proportioned to the rate of rotation of the shaft 24. The wheel 78, for best retention of the liquid in the slots, is preferably made of a material that is readily wet by the solution. Graphite, for example, has been found particularly suitable for the purpose.

As indicated above, chlorine gas is simultaneously supplied to the tower 28 in exact, predetermined proportion to the supply of chlorite solution and to the supply of diluent air. For this purpose, the chlorine gas may be discharged from a cylinder of the usual type 90, through a pipe 91, a pressure reducing valve generally designated 92 and a further pipe or tube 94 to the metering device 22, from which the gas then passes in the pipe 31 to the tower 28. Since the chlorine in the cylinder 90 is maintained at relatively very high pressure and since the present apparatus, particularly the metering and reaction chamber instrumentalities are most conveniently operated at or near atmospheric pressure, the reducing valve 92 is designed to reduce the pressure of the chlorine gas and particularly to permit its supply in the pipe 94 at a substantially constant pressure, preferably that of the atmosphere. It will now be understood that any of various known types of pressure reducing valves or other instrumentalities adapted to keep the chlorine gas (fed through the line 94) at the desired, constant, atmospheric pressure may constitute the device 92, and hence need not be shown in detail. Such devices include a suitable valve and by adjusting the valve in response to changes in the input gas pressure (e. g., in the line 91), function to prevent departure of the outlet pressure (in the pipe 94) from the intended value. Changes in flow of the gas, i. e. in the rate of withdrawal through the line 94, effect correspondingly similar displacements of the regulating value, as will now be readily understood, so as to keep a substantially constant pressure in the feed line 94. The line 94 also has a branch 100 extending to cooperating devices having certain safety or relief characteristics, as described in detail hereinbelow.

The metering device 22 comprises a volumetrically-operated wheel 110, constructed and functioning on principles similar to those embodied in the motor drum 47. The wheel or drum 110 is mounted on the shaft 24 and is enclosed in a housing 111 which has an associated constant level chamber or box 112 to which water is continuously supplied through a pipe 113 and from which excess water continuously flows, over the level-determining wall 114, into an adjacent overflow chamber 115. Water drains from the overflow chamber through a pipe 116 opening in the bottom of the chamber. Communication of water between the box 112 and the chamber 111 is obtained through clearance 117 around the shaft 24 in the wall between these vessels. Thus the water 118, which partially fills the wheel chamber 111, is kept at a constant, predetermined level 119.

The wheel 110 is a drum, having flat side walls 120, 121 (see also Figs. 4 and 5) and a peripheral, cylindrical sheath 122. As seen in Figs. 1 and 5 it also has an inner cylindrical partition 123, extending between the walls 120, 121, so as to provide an annular space between such partition and the outer sheath 122. A plurality of intermediate partitions 124, for example three such partitions 124a, 124b and 124c, extend in a spiral relationship from the inner partition 123 to the outer casing 122; each of the intermediate partitions 124 is conveniently arranged to have a central portion curved concentrically with the drum, and terminal portions extending respectively, in sloping relationship, to the outer sheath 122 and the inner cylinder partition 123. The outer sheath is provided with transverse slots or openings (126) 126a, 126b, and 126c, while the inner partition 123 has corresponding openings or transverse slots (128) 128a, 128b and 128c. The slots 126 and 128 are respectively disposed adjacent the localities at which the partitions 124 meet the outer sheath 122 and the inner partition 123 respectively, the arrangement being, for instance, such as to provide three, spirally overlapping chambers, each extending for approximately 180° around the central axis and opening at opposite ends to the space inside the wheel and to the exterior thereof. Thus for example one such chamber is formed by the partitions 124a and 124b and the intermediate portions of the cylindrical elements 122, 123 and the side walls 120, 121. The stated chamber opens through the outer sheath at the slot 126a, adjacent partition 124a, and through the inner sheath at the slot 128b, adjacent partition 124b.

It may now be explained that the device is adapted to function as a metering and gas transferring device in a fashion somewhat similar to the wheel 47 of the air motor. Thus the gas inlet pipe 94 extends to the interior of the wheel through an axial opening 130 in the wall 120 (the opening 130 being sufficiently large to permit free communication of the water 118 with the inside of the wheel), and at its inner end is turned upward at 131 so that it opens above the level 119 of the water inside the wheel. It will be understood that the water level 119 and the level 119a outside the wheel in the housing 111 are conveniently maintained above the shaft 24 and the entering pipe 94, both for optimum, desired operation of the specific wheel structure shown and to avoid the necessity of gas-proof packing around the shaft.

In view of the preceding description of the wheel 47, it will now be readily seen that if considered as positively driven by the shaft 24, the wheel 110 will operate to transfer successive quantities of gas from the inlet 131 to the space above the water in the housing 111, i. e. by trapping gas in the spiral chambers and forcing it out through the openings 126a to 126c. Alternatively, but with the same resultant effect in the operation of the complete system, the wheel may be considered as rotated (in the same clockwise direction, as viewed in Figs. 1 and 5) by the buoyant action of the gas, i. e. considering the latter to be drawn through the conduit structure 94—31 by the air-propelling instrumentalities 40, 42. Thus gas entering the inner chamber from the inlet pipe 131 tends to fill the intermediate spiral chamber then exposed to the incoming gas through the uppermost slot 128, thereby tending to turn the wheel clockwise (Fig. 5). At the same time, discharge of gas from a previously filled chamber through the upwardly open slot 126a into the outer region of somewhat lower pressure also tends to turn the wheel in the same direction. Considered either as mechanically driven or as self-impelled, the wheel continuously rotates with the shaft 24, and in effect continuously transfers gas from the inner chamber into the successive spiral chambers and thence to the upper part of the housing 111, from which it is withdrawn through the discharge pipe 31, that opens above the water level 119a.

Since the outlet line 31 communicates with the air motor outlet 27 at the head of the tower 28, the pressure at the output side of the chlorine meter wheel 110 will be the same as at the output side of the motor wheel 47, and there will be in effect the same pressure drop across the wheel 110 as across the wheel 47, varying with the rate of flow of air through the latter. Hence the water level 119a outside the wheel in the chamber 111 will be somewhat higher, when the apparatus is running, than the level 119 which is maintained inside the wheel and which is normally the same as that maintained by the box 112. As will be understood, the level 119a rises with increase of rate of operation, and falls with decrease of such rate.

Since the illustrated device is designed to provide a highly dilute output of chlorine dioxide gas, e. g. including air in a proportion of 95% or more by volume, the dimensions of the air motor 20 and its chambers are preferably such that it has a very much greater capacity than that of the gas metering device 22, for example, so that the volume of gas (i. e. air) transferred per unit of time through the motor 20 is, say, about thirty times the volume transferred per unit of time through the device 22. Under such circumstances and even considering the chlorine metering device 22 as self-powered, the turning moment of which the device 22 is capable under the conditions otherwise permitted by the equipment, is wholly insufficient to rotate the complete assembly mounted on the shaft 24; if the shaft is not positively driven by the motor 20, i. e. if for any reason the flow of air fails, the entire system stops running and there is no feed of reagents to the tower.

Furthermore, at all times of operation (and with the liquid level 119 kept substantially constant) the actual rate of flow of gas through the device 22 is volumetrically proportioned solely to the rate of rotation of the shaft 24 and the motor 20, so that the feed of chlorine is always accurately related, in amount, to the feed of chlorite solution and of diluent air. All rates of feed change together, and in the same direction and proportion, whenever the speed of the motor is changed, as by variation in the flow of air (or effluent gas), for instance upon any adjustment of the throttling valve 36.

The main chamber 32 of the preparation or reaction tower 28 advantageously comprises a long, upright cylinder filled, for most of its length, with a mass 140 of fine pellets, granules, pebbles or the like of suitably inert material, which serves to provide a large multiplicity of paths for distribution of the chlorite solution and maximum contact of the chlorine gas therewith. Thus the chlorite solution trickles down through the mass of granules, spreading out, in effect, into a thin film of extremely large surface area, while the gas mixture passes down through the interspaces, for reaction with the sodium chlorite and for removal of the gaseous product, viz. chlorine dioxide. While the dimensions of the tower may vary to suit the requirements of service and the quantity of product desired, it has been found that practically complete reaction of the sodium chlorite, for a maximum yield of 250 grams of chlorine dioxide per hour with proportions of reagents as stated by way of example below, is consistently obtained where the chamber 32 has an inside diameter of 2 inches and a height of approximately 25 inches, the height of the packing of granular material 140 being 21 inches. The latter material, e. g. small pellets of alundum, or of quartz or the like, is supported by a perforate horizontal partition 141 spaced somewhat above the bottom of the tower. For reasons further explained below, the chlorine gas was employed in excess in the cited example of maximum production; the effluent gas from the tower consisted, by volume, of chlorine dioxide 4%, chlorine 1% and air 95%.

While under some circumstances the chlorite solution might be fed directly into the main preparation zone 32, the tower shown includes an upper chamber 143 separated from the main chamber 32 by a horizontal partition 144 through which a tube 145 communicates, the lower end of the tube being bent into a U-shape at 146 to constitute a trap. The chlorite solution from the feeding and metering device 21, e. g. successive slugs of such solution, can enter the chamber 143 from the pipe 30 and drain down the sloping upper surface of the partition 144 into the tube 145. A pipe 148, also communicating with the chamber 143, extends to a source of vacuum or reduced pressure as hereinbelow explained and serves to provide the necessary suction for operation of the take-off device 82 in the solution meter 21.

Under the conditions of operation presently contemplated, the pressure at the top of the main chamber 32 is only slightly below atmospheric, e. g. a vacuum or negative pressure ranging up to about 1 inch of water head, while to operate the solution meter, the relatively constant vacuum in the chamber 143 and the line 30 is preferably somewhat higher, say about 2 inches of water. The supplemental chamber 143 and the trap 145–146 permit separation of these zones of different pressure, while affording desired continuity of flow of the chlorite solution into the main tower portion 32. Thus the chlorite solution in the trap adopts a level in the longer leg 145 which is higher than the open top of the shorter leg by a distance equal to the pressure difference between the chambers. At the same time, as the liquid flows into the tube 145, it correspondingly flows out the top of the short leg and down upon and through the column of granular material 140 as explained above.

The enclosed space 150 at the bottom of the tower below the perforate plate 141 has a lower drain pipe 151 through which the spent solution passes into an overflow tank diagrammatically indicated at 153 in Fig. 1, the pipe 151 conveniently opening below the level of liquid in the tank 153. The bottom tower chamber 150 also leads to the discharge pipe 34, through which the gaseous product is withdrawn. As explained above, the pipe 34 includes a metering orifice 35 of appropriately fixed dimensions across which a manometer generally designated 155 is connected. The manometer, as diagrammatically shown in Fig. 1, may comprise a transparent vessel 156 partly filled with water 157 and opening at its top through a passage 158 to the upstream side of the orifice 35. A transparent metering tube 160 communicating with the pipe 34 at the downstream side of the orifice extends into the vessel 156, opening below the level of the water 157. Since the pressure drop across the orifice 35 varies with the flow of gas through it, water will rise in the tube 160 to a level which represents the pressure drop, and thus affords a continuous visual indication of the actual rate of flow of gas through the tube 34. From the latter, the product gas traverses the throttling or control valve 36 and is drawn into the pipe 38, which carries it to the locality of use, for example to an appropriate agitating or mixing chamber (not shown) in plants or mills where the chlorine dioxide is to be employed for the treatment of flour or like products.

It will now be seen that the system affords an accurately regulated feed of air, chlorine gas and chlorite solution to the reaction tower 28, which cooperates to provide effective reaction of the supplied reagent fluids, and separation of the desired gaseous product from the spent solution. A constant proportionality is automatically maintained among the several fluids in that the metering device for feed of each is positively and mechanically connected to operate only when the metering devices for the others are working. Furthermore, requirements of safety are fully assured; if there is any failure or even change of the rate of supply of diluent air, the supply of the reactant fluids is immediately and automatically interrupted or reduced, so that no gaseous mixture can be produced unless it contains the required dilution. The production rate of the chlorine dioxide itself is readily controlled at one convenient locality, e. g. by the valve 36, with high accuracy despite the fact that at such locality the gas is so highly diluted. The entire apparatus is completely automatic and involves a remarkable simplicity of constituent elements, requiring little or no service over long periods of time. All bearings and moving parts of gas-handling equipment are water-sealed (or otherwise integrally sealed as in the case of certain valves hereinbelow described), so that no gas-tight packing of bearings is required.

Elements of the machine in contact with chlorine, chlorine dioxide or sodium chlorite solution should be of appropriately inert construction; while any of a variety of substances may be employed (including porcelain, glass, and certain plastics and metals), it is advantageous to make the tower, tanks, chambers, the wheel 110, and indeed nearly all major parts shown in the drawings (Figs. 1–8), of transparent material, affording full inspection of the operation of each device at all times. While glass can be used, transparent plastic, such as the methyl methacrylate type of resin called "Lucite," has been found especially suitable for the various structures, both for inertness and for simplicity of manufacturing operation.

Figures 2, 3:
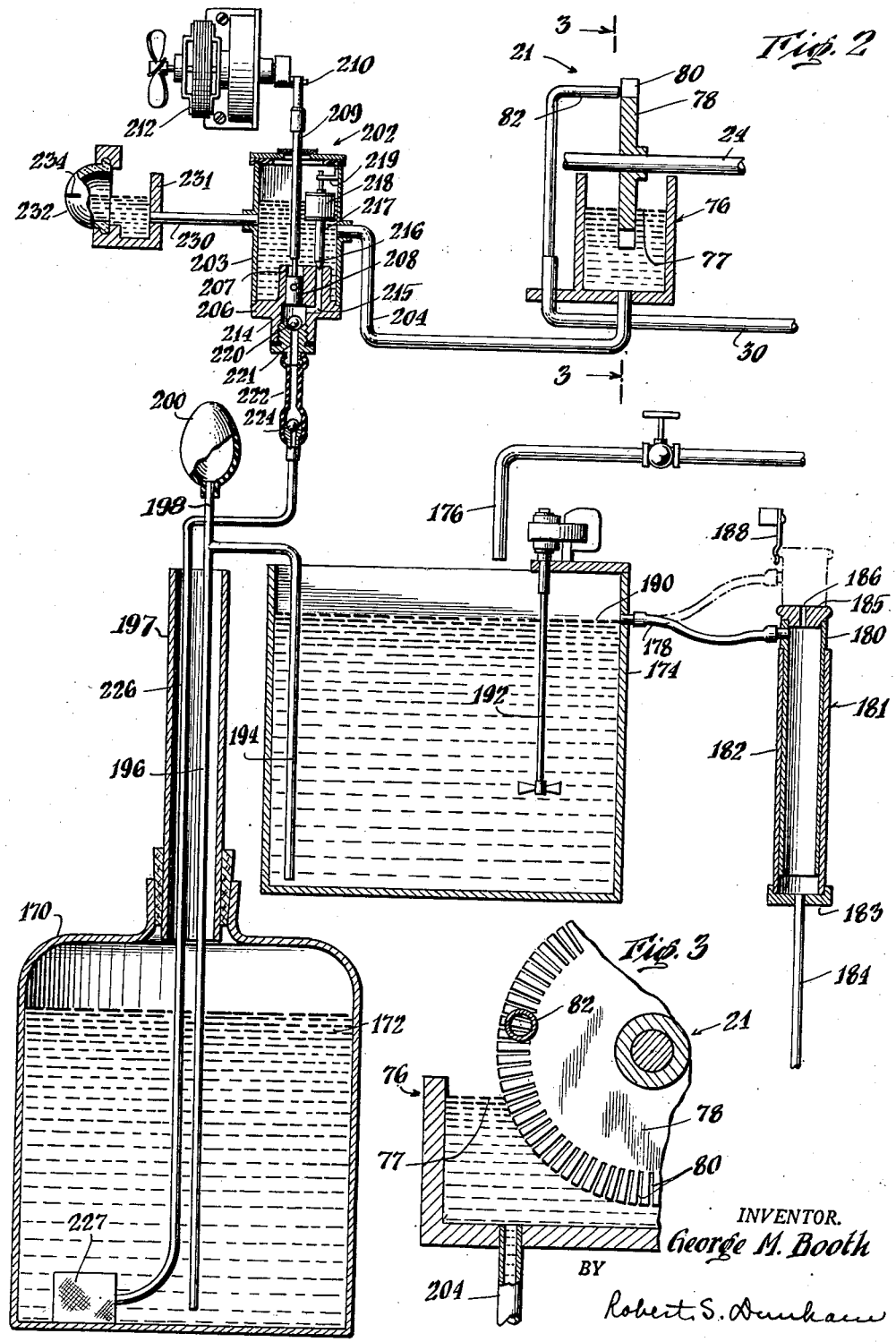
Fig. 2 is a view, chiefly in vertical section, of certain liquid-supplying instrumentalities that are preferably to be embodied in the system of Fig. 1.
Fig. 3 is a fragmentary, enlarged vertical section of the solution meter, taken as if on line 3—3 of Fig. 2, but with one part in somewhat different position than as shown in Fig. 2.

Fig. 2 illustrates certain further features relating to the preparation and supply of chlorite solution, which are of cooperative advantage for the system of Fig. 1, and which may be understood to be included in the preferred organization of that system. Here the solution pumping and metering device 21 is shown, operated by the shaft 24 and having the suction take-off pipe 82 above the liquid level for withdrawal of liquid from the notches 80 of the wheel 78, the solution then being delivered to the tower 28 (Fig. 1) through the pipe 30 as above described. Although the arrangement shown for simplicity in Fig. 2, with the take-off tube 82 adjacent the upper edge of the wheel 78, can be employed in some cases, it is now preferred to place the tube 82 at a somewhat lower position, to avoid depletion of liquid in the slots 80; experience indicates that sodium chlorite solution has some tendency to drain back down the side of the wheel from the slots as they reach the top of their orbit. Accordingly the tube may be located as shown in Fig. 3, for example on a wheel radius angularly elevated by about 10° or so from the horizontal diameter of the wheel; with the opening of the tube covering about the inner two-thirds of the slots, the slight tendency of the contained solution to flow back in each slot then appears to assist the removal of liquid by suction. The tube 82 may conveniently be wide enough to open across more than one slot, i. e. as shown in Fig. 3, for maximum liquid-withdrawing effect. Experience indicates that in such case any partial relief of vacuum by the first-emptied of any two slots simultaneously registering with the tube 82 is not detrimental.

A large bottle or tank 170 (corresponding to the tank 70 in Fig. 1) may constitute the reservoir holding the solution 172 of sodium chlorite. Since this reagent is customarily sold as a divided, crystalline solid, it must first be made up into a solution of desired concentration. To that end an open tank 174, into which water may be run from a pipe 176, is disposed at a locality above the reservoir 170. At a predetermined height above its bottom, the tank has an outlet device including a flexible tube 178 opening into the top of the upper cylindrical section 180 of a vertically telescoping chamber 181, the section 180 sliding into a lower cylindrical section 182. The lower chamber section is closed at the bottom 183, except for a drain pipe 184. The upper section 180 has a closed top 185 provided with a vent tube 186. Ordinarily the section 180 is raised to an upper or extended position as indicated in dotted lines, where it may be releasably retained by suitable means schematically indicated as a spring clip 188.

To make up a batch of chlorite solution, the telescoping chamber is placed in its lower or normal position and water is run into the tank 174 from the pipe 176 until the water drains from the tank through the tube 178, chamber 181 and drain 184, thus establishing the predetermined level 190 which is governed by the location of the outlet through the tube 178. The telescoping tube 180 is then raised to its upper or dotted-line position, to prevent loss of solution in the subsequent mixing and transfer operations. A separately weighed amount of dry sodium chlorite is added to the water in the tank and a mixing device 192 is operated to stir the liquid and effectuate prompt solution of the chlorite. In this manner, exact proportionality of chlorite and water is easily achieved, without special skill on the part of the operator. As one example found to afford efficient operation of the system under specific conditions elsewhere set forth herein, the level 190 in the tank may represent a volume of 5.92 gallons of water, to which 13½ pounds of technical grade, sodium chlorite crystals are added, to make up a batch of solution which will last for upwards of eight hours.

A siphon tube having an upper vertical leg 194 extending practically to the bottom of the tank 174 and a longer vertical leg 196 extending to the lower part of the reservoir 170 is provided to conduct liquid from the tank 174 to the reservoir. The leg 196 enters the reservoir 170 through an open riser or tube 197 which affords ample clearance for access to permit siphon operation. The wide riser 197 extends well above the level 190 in the tank 174 beside it, so that if transfer of solution should be started when the reservoir 170 is full, the liquid may fill the riser to the stated level and automatically stop the siphon action without any overflow. The upper end or turn of the siphon 194—196 has an upwardly extending branch tube 198 opening into a flexible, otherwise closed rubber bulb 200, which may be manually operated to fill the siphon and initiate its operation at desired times. Assuming that enough liquid remains in the reservoir to submerge amply the lower end of the tube 196, the size of the bulb 200 is conveniently such that a single squeezing operation will expel enough air from the siphon to effectuate filling of at least one leg (e. g. the leg 194) and the bend of the device with solution, i. e. by suction when the bulb is released. Siphon action is thus initiated, and thereafter continues of its own accord, transferring solution from the tank 174 to the reservoir until all the solution has been drawn from the tank or the flow otherwise arrested as explained above.

While separate pumping and level maintaining means as diagrammatically indicated in Fig. 1 may be provided for the solution metering device 21, a presently preferred arrangement is shown in Fig. 2, viz. a constant level pump generally designated 202, which obviates the possibility of incrustation of chlorite in overflow structures. The device 202 comprises a solution-receiving vessel 203 communicating through the pipe 204 to the lower part of the meter 21, so that liquid may flow freely between the devices and stand at the same level in each. The lower part of the vessel 203 encloses a pump block 206 containing a vertical cylinder 207 in which a piston 208 is reciprocated by a piston rod 209 linked to a crank pin 210 that is eccentrically carried by the shaft of an electric motor 212. In the block 206, the lower end of the cylinder 207 opens into a pump chamber 214 from which a passage 215 extends upwardly into the liquid-receiving space of the vessel 203. The upper end of the passage 215 constitutes a seat for a valve member 216, providing the outlet check valve of the pump. The valve member, however, has an upright supporting shaft 217 which carries a float 218 and is loosely guided for vertical motion by suitable guide means 219. The lower end of the pump chamber 214 is provided with a ball check valve 220 at the inlet passage 221 which opens from a section of flexible tubing 222 that extends upwardly from another ball check valve 224. A pipe 226 opening through a filter 227 at the bottom of the reservoir 170 serves to conduct solution from the reservoir to and through the check valve 224, the tube 222 and the check valve 220 into the chamber 214.

Upon reciprocation of the piston 208, pumping action is obtained through the chamber 214, the liquid being drawn up through the check valves 224 and 220 and discharged, on alternate strokes, through the outlet valve 216. By virtue of the float-supported character of the valve element 216, adjusted to correspond with a predetermined level of the liquid in the vessel 203 and the metering device 21, the actual pumping operation is automatically limited to the withdrawal of no more solution than is necessary to maintain such liquid level. Thus to the extent that the liquid in the vessel 203 tends to rise above the desired level, the float 218 keeps the valve 216 open, or sufficiently open, so that reciprocation of the piston fails to open the check valves 220—224 and simply effects a displacement of the liquid back and forth through the passage 215 between the chamber 214 and the main part of the vessel. On the other hand, when the liquid level tends to fall, the float 218 no longer sufficiently supports the valve 216, and the latter then operates in the ordinary sense of a check valve, remaining closed on upward strokes of the piston and opening appropriately on the downward or delivery stroke. The net effect of the pump operation is to supply to the metering device 21 only sufficient solution to maintain the desired level, and thus to replace exactly the same quantity of solution as is withdrawn from the device 21 by its capillary wheel 78 and take-off tube 82.

For visual indication of the condition of these elements, an auxiliary tube 230 extends from the vessel 203, below the normal liquid level to a separate chamber 231 having in its outer wall a transparent sight bulb 232, which carries a mark 234 representing the predetermined liquid level. Since the solution stands at the same level in the chamber 231 as in the vessel 203, any failure of the level-maintaining pump device 202, or any other failure such as exhaustion of the solution supply is immediately observed at the sight bulb.

Incorporated in the system of Fig. 1, the described instrumentalities thus afford simple and effective means both for supply of solution with the required continuity and regulation, and for ready make-up of fresh batches of solution as may be required from time to time.

To start the pump 202 after a period of non-use, it may be primed by pinching the flexible tube 222 a number of times, between the check valves 220 and 224.

Fig. 4 shows further means that preferably constitute a cooperating part of the complete system of Fig. 1, as above indicated by reference. More specifically, Fig. 4 shows the chlorine metering device 22, receiving chlorine gas through the pipe 94 from the reducing valve 92 (Fig. 1), which keeps the gas at approximately atmospheric pressure. The line 94 has the branch pipe 106 leading to a safety and relief assembly generally designated 240. This device comprises a pair of sealed, conveniently transparent chambers 241, 242, closed at the bottom by a mounting block structure 243, and each partly filled with water supplied through corresponding passages 244, 245 opening through the block. The last-mentioned passages communicate with a horizontal passage 246 which may be supplied with water from the pipe 53, i. e. the overflow drain from the constant level box 48 of the air motor in Fig. 1. It may be noted here that the air inlet pipe 26 of the air motor (Fig. 6) may have a downwardly extending U-shaped portion from which a condensate drain tube 248 leads, conveniently draining into the passage 246, as shown in Figs. 6 and 4 taken together. Thus any liquid which may condense from the air drawn into the motor is separated and removed to prevent a friction drop due to any partial filling of liquid in the air inlet line.

Referring further to Fig. 4, the chamber 242 has an upright overflow pipe 250 which communicates through a pipe 251 with an overflow tank 253, so that water continuously supplied to the chambers through the passage 246 overflows constantly into the pipe 250, and a constant, predetermined level is maintained in the chamber 242. A tube 254 also extends up into the vessel 242 above the water level, and communicates with the atmosphere through a pipe 256 and the upper, open part of the overflow chamber 253 from which a further pipe 258 extends. The pipe 258 is preferably carried to a locality outside of the building (not shown) in which the apparatus is located, for appropriate vent of any chlorine gas or other fumes that may reach the chamber 253 because of solution of chlorine in the water. The conduit 256 opens into another branch which includes a relief tube 260 in the chamber 241. The open, upper end of the tube 260 is enclosed by a bell 262 which has a skirt depending below the level of the water in the chamber 241, the skirt of the bell being perforated at 264. The structure and weight of the bell are such (as will be now readily understood) that when the pressure in the chamber 241 is essentially atmospheric and the level of liquid is the same as in the chamber 242, the bell rests lightly on the upper end of the tube 260, with the holes 264 submerged.

The branch pipe 106 extending from the chlorine supply line 94 communicates with a passage 265 in the block 243 and thence with an upright tube 266 that also opens well above the normal level of water in the chamber 241. The tube 266 has a lower, communicating extension 267 (for condensate drain and for relief of any large and sudden increase of chlorine pressure) which opens into the overflow chamber 253, below the water level thereof. Through the above described conduit series 106, 265, 266, the interior of the chamber 241 is maintained at the same pressure as the chlorine supply line 94.

Thus as long as the pressure in the supply line 94 is essentially atmospheric, the pressure in the chamber 241 will be the same, keeping its water level at the normal predetermined height, substantially equal to that in the air chamber 242. If, however, an excess of pressure appears in the chlorine supply line 94 (as by improper operation of the reducing valve or for any other cause) pressure correspondingly rises in the upper part of the chamber 241, depressing the water level of liquid in it. As a result, the apertures 264 in the bell 262 are uncovered, permitting communication between the tube 260 and the interior of the chamber. Since the tube 260 opens to the outside atmosphere, the excess pressure in the chamber and consequently in the chlorine feed line 94 is immediately subjected to relief, e. g. by passage of the excess chlorine out of the system through the pipe 258, and further departure of the pressure in the line 94 from the desired atmospheric value is prevented, i. e. departure beyond the relatively small change needed to operate the device just described. Thus automatic means are provided for immediately relieving any tendency toward substantial excess pressure which may appear in the chlorine supply line, and for preventing any serious mis-operation of the metered feed of chlorine through the device 22 to the reaction tower 28 (Fig. 1).

On the other hand, if for any reason the pressure in the line 94 should drop substantially below atmospheric, i. e. building up a suction or vacuum which might be caused by exhaustion of the chlorine supply or fault of the reducing valve, the gas pressure in the chamber 241 correspondingly falls and the water level rises. At the same time, since the pressure in the bell 262 has remained atmospheric, the pressure fall in the chamber effects a change in the relative buoyancy of the bell, so that it rapidly floats up with the water in the chamber 241. That is to say, when the pressure outside the bell becomes less than that inside, the resulting buoyancy carries the bell upward from its normal position in which it rests lightly on the top of the tube 260. Since the water level inside the bell remains unchanged (being governed by the level in the chamber 242), the upward displacement of the bell structure carries the apertures 264 above the internal water level, and air then passes out through them, bubbling up into the chamber 241 and promptly relieving any further increase of the undesired vacuum that may have appeared in the line 94. The device 240 is also of advantage when the apparatus has to be shut down; thus upon closing the valve of the chlorine supply tank 90 (Fig. 1) while the devices 20 and 22 are kept running, the relief means will suck air which is carried along to purge the system of chlorine before complete shut-down.

In the fashion described above, the device 240 operates automatically to prevent any untoward results upon departure from the intended pressure conditions in the chlorine line 94, and indeed keeps the pressure within a small range in the vicinity of the desired atmospheric or other value, by promptly relieving any unduly high or low pressure that may arise. In either case the requirements of safety are fulfilled, since in effect the relief operation positively prevents any such increase of chlorine gas flow as might enlarge the ratio of chlorine to air in the feed to the tower 28.

For visual indication of the chlorine supply pressure, a sight tube or manometer 270 is provided, comprising a transparent tubular chamber 271 communicating at top and bottom respectively, through tubes 272 and 273, with the chlorine line 106 and the water passage 246. Hence the water level in the tube 271 will be the same as in the chamber 241. Graduations 275 are provided on the tube 271, showing the level for atmospheric pressure of the gas, and the limits within which the pressure may vary before the relief device 240 operates; thus if the water stands at either limit on the glass, the attendant knows at once that something is wrong with the apparatus.

The overflow chamber 253 has its own overflow drain 276, located to maintain a predetermined level in the chamber and thus to afford a water seal for the pipes 267, 251. The drain 184 from the leveling device of the solution make-up tank (Fig. 2) also conveniently runs to the chamber 253, below its water level.

The portion of the system (Fig. 1) which includes the preparation chamber and the controlling and distributing means for the completed product is illustrated in somewhat further detail in Fig. 8. As shown here, the supply of air for operating the air aspirators and for effectuating ultimate distribution of the product, is drawn into the pipe 41 through a filter 280 by the impeller-type pump 40a, from which it is passed through a pipe 281, then past a relief-type constant pressure valve 282 and through a further conduit 283 to a manifold passage 284 in a manifold block 285. The relief or regulating valve 282 may be of any suitable construction adapted to maintain the pressure of gas at its inlet side (i. e., its single connection to the line 281—283), at a predetermined value such as two pounds per square inch, gauge pressure, by relieving and discharging excess flow of air from the pump or blower 40a. Although in some cases other kinds of pumping and pressure-regulating means may be used, the displacement type of blower 40a is peculiarly advantageous, and its excess capacity over actual demand is readily relieved by the valve 282.

The manifold 284 communicates with a plurality of air aspirators 42, of which two, viz. 42a and 42b are here shown by way of example, each aspirator leading to a final discharge or distribution pipe corresponding to the pipe 38 in Fig. 1. The specific apparatus of the drawings is designed to provide four separately controlled streams of dilute chlorine dioxide, for use at four correspondingly different locations. Accordingly four discharge conduits 38a, 38b, 38c and 38d are provided, each fed from the manifold 284 with an aspirator as illustrated at 42a and 42b. The manifold 284 also extends to a further air aspirator 286, connected, at its throat, to produce the desired suction in the line 148 leading from the top chamber 143 of the tower 28, the tower being here shown in somewhat more detail than in Fig. 1.

The gaseous product withdrawn from the base of the tower through the pipe 34 is carried to a manifold passage 290 in a control block structure 291. The latter carries, for each of the ultimate distribution pipes 38a to 38d a corresponding plurality of metering orifices, manometers and control valves exemplified by the orifice 35, manometer 155 and valve 36 in Fig. 1. Thus a passage 292a leading from the passage 290 conducts a portion of the gas to and through the orifice 35a and thence via a passage 293a to the control valve 36a. The orifice 35a is enclosed by a transparent sight bulb 294a, permitting ready inspection as to clogging or other derangement of the orifice.

A manometer 155a is connected across the orifice 35a, including a transparent vessel 156a containing water and opening to the passage 290. To complete the U-tube structure of the manometer a transparent tube 160a extends to the passage 293a, at the downstream side of the orifice, and opens under the water in the vessel 156a. The level to which water rises in the tube 160a varies with changes in flow through the orifice 35a and thus affords a visual indication of the rate of flow of gas through the passages 292a—293a and the ultimate distribution pipe 38a, the tube 160a being graduated, or read against a scale (not shown) marked in units of flow, e. g. grams of chlorine dioxide per hour. The outlet port of the valve 36a is connected by a tube 298a to the throat of the aspirator 42a, which applies the desired suction or negative pressure to advance the gaseous product in this line of distribution and to provide at least part of the propulsion of air and gas through the metering devices, as explained in connection with Fig. 1.

The valve 36a can be of a simple throttling type, including a member 300a urged away from its seat by a spring 301a acting against a shoulder on its stem 302a, adjustment of the member 300a toward and away from the seat and maintenance of such member in a desired position of adjustment being effected by turning a screw-mounted knob 304a, which abuts the end of the stem 302a. For security against gas leakage, the valve stem may be conveniently fashioned in two sections secured at their adjacent ends to opposite sides of a flexible diaphragm 305a which is peripherally sealed in the wall of the block 291.

The manifold 290 extends to three other sets of indicating, controlling and suction-producing devices identical with those just described, and corresponding to the other three outlet pipes 38b to 38d. Such parts of these other devices as are shown in the drawing are identified with the same numbers but different letters, i. e. the manometers 155b to 155d, orifice 35b, orifice viewing bulbs 294b to 294d, control valve 36b, valve knobs 304b to 304d, tubes 298b to 298d, leading from the valves, and aspirator 42b fed from the air manifold 284 in the same way as the other aspirators which serve to deliver the gaseous product into the pipes 38a to 38d.

A manometer 310 connected to the air supply line 283 and consisting of a transparent, mercury-containing U-tube open at its further leg 311, indicates the air pressure, which is preferably kept constant.

As stated above, the aspirator 286 provides suction in the line 148, for withdrawal of liquid by the take-off tube 82 from the metering wheel 78 (Figs. 1, 2 and 3). Since only a relatively small vacuum and moderate air flow are necessary while reliability dictates the maintenance of excess capacity for removal of air at the aspirator 286, regulating or relief means are provided, comprising a glass ball 314 resting by its own weight on a seat 315 at the outer opening of a passage 316 which extends between the upper tower chamber 143 and the outside air. The weight of the ball 314 is selected so as to maintain the desired negative pressure in the system, e. g. equal to about 2 inches of water. If the vacuum in the chamber 143 tends to rise above such value, it lifts the valve ball 314, permitting air to enter and relieve the excess; in practice, the valve bleeds air in continuously to keep the vacuum at the desired 2 inches.

As the solution overflowing the trap 145 trickles down through the tower packing 140 and as the chlorine gas from the pipe 31, highly diluted with air from the pipe 27, flows down through the same packing, the desired reaction occurs, with the accompaniment of extensive aeration for effective separation of chlorine dioxide from the liquid. Thus the gaseous product withdrawn from the lower chamber 150 comprises the evolved chlorine dioxide mixed with a large proportion of air. The spent liquid, essentially a solution of sodium chloride, drains off through the line 151a, which conveniently discharges below the liquid level in the drain manifold vessel 253 of Fig. 4.

Further details of the operation of the complete system should now be readily understood, from the foregoing description. The extent to which gas and air are propelled through all the upstream portions of the apparatus by the relatively high negative pressure developed by the aspirators 42 depends on the condition of the valves 36. Thus only when one or more of the valves 36 is opened, is there a flow of air in the conduit structure of line 26, motor 20, line 27, tower 28 and line 34, and only under such circumstances does the air motor operate. In other words it is only when delivery of gaseous product is desired and the air motor is turning to deliver diluent air, that the reactant fluid metering devices 21 and 22 are actuated to supply chlorine and chlorite solution to the tower. The solution metering wheel 78 feeds the liquid (by successive slugs) at an average rate which is exactly, volumetrically proportioned to the rate of rotation of the drive shaft 24 from the air motor. The chlorine gas is fed in similarly exact, volumetric proportion to the speed of the shaft 24; the chlorine metering device 22, like the air motor 20, involves movable chamber means repeatedly or cyclically operating to displace measured volumes of the gas in the conduit structure of which such device forms a part, so that the volume of gas displaced per unit of time is governed directly and only by the rate of mechanical operation.

The safety and relief instrumentalities generally designated 240 cooperate with the positive-transfer type of metering device 22, in guarding against departure from the desired conditions of chlorine feed, and in positively preventing any greater feed of the reagent than is properly accompanied by the desired, high proportion of diluent air. The entire apparatus also includes the various described indicating means of simple and effective sort, arranged so that relatively unskilled operators may observe the operative condition of the equipment at all times, e. g. with respect to chlorine gas feed, solution feed, operating air pressure, and the rate of delivery of the gaseous product in each of the output lines 38a to 38d, such rates being read on the corresponding manometers 155a to 155d, which respond practically instantaneously to changes in setting of the respective control valves 36.

Although for different purposes, other conditions and relationships of positive or negative pressures (including the maintenance of positive instead of negative pressures, if desired) may be adopted in systems of the sort here disclosed, the values mentioned above and summarized below represent one specific example of peculiarly effective operation, which involves features of distinct novelty and advantage. More specifically, in such setting and operation of the apparatus the air pressure in the supply manifold 284 is maintained at a relatively high value, e. g. about 2 pounds per square inch, so operating the aspirators 42 that a static vacuum as high as 50 inches of water (dropping, say, to 40 inches at maximum flow) may be reached in each of the tubes 293a to 298d. Since air enters the air motor 20 through a filter 316 (Fig. 6) and the line 26 at atmospheric pressure, the negative pressure in the line 34 (Fig. 8) is equal to the sum of the friction losses through the air motor and the tower 28. The loss in the air motor varies from zero at zero flow up to a maximum drop of about 1 inch of water, i. e. when all four of the valves 36 are open to the indicated maximum flow. The drop through the chlorine metering device 22 is of like order but because of the relatively small flow of chlorine need not be considered as affecting the pressure at the head of the tower. In the specific device described, the loss through the tower packing ranges up to 8 inches of water at maximum output flow, so that the vacuum in the line 34 varies from zero to 9 inches.

The dimensions of the orifices 35 may be such, for instance, that in each distribution line, a desirable maximum flow produces a drop across the orifice of about 8 inches of water. Hence the drop across each control valve should represent, approximately, the difference between the high 50 to 40 inch vacuum at the aspirators and the vacuum in the corresponding line 293, which is to range from zero (with the valve closed) to about 17 inches. Thus the friction loss required at each valve throughout its useful range of opening is relatively large, varying from a substantial minimum equal to many inches of water (at maximum flow) through a range which is itself relatively small, so that for the most part, changes of valve opening represent only minor changes in the pressure drop across the valve. Under these circumstances in the system shown, each of the valves may be independently closed, or opened to any desired degree without very matrially affecting the condition of pressure or flow in the other distribution branches. Viewed in a more comprehensive sense, the fact that even with maximum flow in all branch conduits at once the total drop in each, i. e. between the upstream side of the metering orifice 35 and the downstream side of the valve 36, is substantially more than half the entire drop from the air inlet 26 to the aspirators 42 (being usually three-fourths of such drop at maximum flow, and ranging to far higher proportions at lower flows or with fewer branches in operation), permits separate control of each branch by its valve while leaving the flows in the other branches substantially unchanged. At the same time, the manometer 155 across the fixed metering orifice that is arranged in series in each branch affords a reading which always represents, with reasonable accuracy, the actual flow of chlorine dioxide past it.

As stated hereinabove, one example of operation involved making up chlorite solution (in the tank 174) with the proportions of 13.5 pounds of technical sodium chlorite to 5.92 gallons of water, i. e. about 0.2 gram of chlorite per milliliter, for feed to the tower 28 by the device 21. It has been found that expedited and economical operation, consonant with a tower of the conveniently moderate size mentioned above, is achieved by feeding the chlorine at a rate which considerably exceeds the theoretical amount necessary for reaction with the supplied chlorite. In the described apparatus, feed of chlorine in an amount 25% or more in excess of the stoichiometric value has been found to convert at least about 95% of the chlorite to chlorine dioxide; for insurance of substantially complete reaction and maximum economy in the use of sodium chlorite, as much as 50% excess of chlorine may be employed. Thus for instance to produce an output of 100 grams of chlorine dioxide per hour, 705 ml. (milliliters) of sodium chlorite solution (of the above concentration), 0.183 pound of chlorine and 30.4 cubic feet of air were fed per hour to the tower 28. This represented a gas and air input to the tower containing 3% chlorine gas by volume. The effluent product, in the line 34, contained 4% by volume of chlorine dioxide, the remainder being air except for a small percentage of chlorine constituting the stated 50% excess. It has been found that for at least certain uses of chlorine dioxide, for example in treatment of flour or the like, the presence of chlorine in the product gas is not objectionable, and indeed may be of some advantage.

It will be appreciated that the 4% chlorine dioxide product, delivered through the tubes 298 is further and substantially diluted by the air from the line 284, in the ultimate delivery pipes 38. Although for special purposes other means may be adopted for developing the necessary propellent action in the gas delivery lines, the further diluent effect of the aspirators is in no wise deleterious in most uses of such gas, e. g. as in flour treatment where only a relatively minute quantity of the active reagent, chlorine dioxide, need be distributed throughout a relatively large mass of flour or the like.

While systems of the character disclosed may be used for preparing other kinds of gaseous mixtures (by reaction or otherwise) or more specifically for preparing chlorine dioxide by other operations, e. g. in feeding sulfuric acid and sodium chlorate solution simultaneously to a tower or reaction chamber along with a large volume of diluent air (such other operations involving use of various numbers of liquid metering devices or gas metering devices or both, coupled on the air motor shaft), the illustrated apparatus represents a particularly effective combination of instrumentalities for the safe production of a dilute chloride dioxide product. As stated above, the metering devices are positively controlled to maintain the desired fluid supply relations, and although for some purposes other types of air motor or like controlling device and likewise other types of reagent feeding or metering means coupled thereto may be used, the selected elements cooperate peculiarly and efficiently to the maintenance of a truly volumetric proportionality, under convenient conditions of pressure and at rates of feed suitable to the requirements of use of the product. All parts are biased, so to speak, on the side of safety, in the maintenance of ample dilution at all times. The paths of gas flow throughout the apparatus are effectively sealed, preventing leakage of chlorine dioxide and indeed permitting no appreciable escape of chlorine gas within the room or other enclosed region where the equipment may be located. Finally, the entire system is extremely simple to operate and adjust, and fully satisfies the several objects above set forth.

It is to be understood that the invention is not limited to the specific apparatus and procedures herein disclosed by way of example, but may be carried out in other ways without departure from its spirit.

What is claimed is:

1. Apparatus for the controlled preparation, by chemical reaction, of a gaseous treating agent which is delivered, for treatment purposes, as a non-hazardous gaseous product of uniform composition containing a major proportion of inert diluent gas, comprising in combination, means providing a chamber constituting a reaction zone, conduit structure extending from a supply of diluent gas to said zone and from said zone to an outlet for delivery of said gaseous product, means for advancing the said gas along said structure and through the zone, and in the form of the gaseous product to the outlet, rotatable means connected to said conduit structure upstream of the zone for operation to turn only at a rate proportioned to the rate of advance of the diluent gas to the preparation zone, said rotatable means turning only when diluent gas is advanced, liquid holding means adapted to receive liquid from a supply thereof, an associated rotatable member having an apertured peripheral region, and adapted to dip into the liquid in said holding means and to turn its periphery out of said liquid, for elevating successive quantities of liquid from the body thereof in its apertured region, means including conduit structure extending to said preparation zone for withdrawing the successive quantities of liquid from the rotatable member, and means coupling said rotatable member to the first-mentioned rotatable means for operation synchronously thereby, to effectuate supply of liquid to the preparation zone only in a predetermined proportion to the supply of diluent gas.

2. In apparatus for preparing a gaseous product from a plurality of fluid constituents of which at least one is a gas, in combination, chamber means providing a reaction zone to receive the constituents and prepare the product, means for advancing said plurality of fluids to the zone in predetermined quantitative relationship to each other, said advancing means including a volumetric metering device for transferring the said constituent gas in measured volume to the reaction zone, and means for operating said device at a controlled rate to deliver the gas at a correspondingly proportional rate so long as the gas is received by the metering device at a predetermined pressure, a source of said gas at a substantially different pressure, means including pressure modifying means and a conduit between said modifying means and the gas metering device, for transmitting said gas to its said metering device at the predetermined pressure from said source of the gas at said substantially different pressure, and relief means connected in said conduit intermediate said pressure modifying means and the metering device for said gas, and responsive to departure of said gas from the predetermined pressure, for opening communication between the conduit and the atmosphere in a direction to change the quantity of gaseous fluid passing from the pressure modifying means to the metering device, for preventing the pressure of the said gaseous fluid from departing further from the predetermined value, said relief means comprising a vessel communicating with the gas in its passage intermediate the pressure modifying means and the metering device, said vessel being partially filled with liquid, said relief means being adapted to maintain said liquid at a level corresponding to the pressure of the gas, and means in said vessel and buoyantly controlled by the liquid therein, for opening said vessel into communication with the atmosphere upon departure of said liquid from a predetermined level, to prevent the pressure of the gas from departing by more than a predetermined extent from the predetermined value.

3. In apparatus for preparing a gaseous product to be derived from a mixture of fluids, in combination, conduit structure extending from an inlet open to the atmosphere to an outlet for delivery of the gaseous product, means in the conduit structure constituting a preparation zone, means connected with the conduit structure for advancing air along the conduit structure to and through said zone from the inlet, said means including a metering device in the conduit structure upstream of the zone, actuated by the advancing air, a second conduit structure adapted to extend to a source of gas under higher-than-atmospheric pressure for conveying said gas to the preparation zone, a metering device in said second conduit structure and adapted to receive gas at atmospheric pressure in said second conduit structure, said second metering device comprising volumetric metering structure proportionately actuated by the first metering device for transferring said gas at atmospheric pressure along said second conduit structure to the reaction zone in proportion to the flow of air through the first metering device, pressure reducing means in said second conduit structure up-stream of said second-mentioned metering device for reducing the pressure of the gas to substantially atmospheric value, and pressure relief means connected to the second conduit structure intermediate the reducing means and the second-mentioned metering device, and including pressure-controlled means movable in response to a departure of the gas in said second conduit structure from a pressure at least in the vicinity of atmospheric pressure, for opening communication between said second conduit structure and the atmosphere in a direction to restore the pressure in the said second conduit structure to the vicinity of atmospheric pressure, for relieving said pressure departure.

4. In apparatus for preparing a gaseous product to be derived from fluids which include respectively air and another gas, in combination, preparation zone means, a first conduit structure open to the atmosphere and extending to said preparation zone means, an air metering device in said first conduit structure, a second conduit structure extending from a source of said gas under higher-than-atmospheric pressure to the preparation zone means, a volumetric gas metering device in said second conduit structure, controlled by said first metering device for proportionally transferring gas received by said second metering device at substantially atmospheric pressure, pressure reducing means in said second conduit structure up-stream of said second-mentioned metering device for reducing the pressure of the gas to substantially atmospheric value, and pressure relief means connected to the second conduit structure intermediate the reducing means and the second-mentioned metering device, and responsive to a departure of the gas from a pressure at least in the vicinity of atmospheric pressure, for opening communication between said second conduit structure and the atmosphere in a direction to restore the pressure in the said second conduit structure to the vicinity of atmospheric pressure, for relieving said pressure departure, said relief means comprising a pair of closed chambers each partially filled with liquid and communicating with each other below the surface of the liquid in each, means for communication between the upper space of one chamber and the aforesaid second gas supply conduit structure, means for communication between the upper space of the second chamber and the atmosphere, overflow means for maintaining the liquid level in the second vessel at a predetermined height, means including a third conduit structure extending into the first vessel from the atmosphere and including an air-buoyed bell normally closing said third conduit structure over the liquid, for response to change of level in said first vessel occasioned by change of pressure of the gas, said bell having a perforated portion normally disposed below the level of the liquid, so that upon displacement of the liquid level outside the bell occasioned by departure of the gas pressure from substantially atmospheric value, said apertures are uncovered to provide communication between the third conduit structure leading to the atmosphere and the second gas conduit structure.

5. Apparatus for preparing an air-diluted gaseous product to be derived from a reaction of a reagent gas and a reagent liquid, comprising, in combination, conduit structure adapted at one end to receive air at atmospheric pressure and extending to a delivery locality at the other end, said conduit structure including a plurality of branch delivery conduits at the delivery locality, a plurality of gas-advancing means respectively connected to said branch conduits for withdrawal of gaseous product from each, said gas-advancing means being individually and collectively adapted to advance air and gaseous product along said conduit structure, control valve means in each branch conduit up-stream of the gas-advancing means, means in said conduit structure intermediate the air receiving end and the branch conduits, to provide a reaction zone for preparation of the gaseous product, a rotary air-actuated motor connected in said conduit structure up-stream of the reaction zone and operated by the advancing air and at a rate volumetrically proportioned thereto, said motor having a propeller shaft, a second conduit structure for passage of reagent gas from a source thereof under pressure to the reaction zone, means in said second conduit structure for reducing the pressure of the reagent gas to substantially atmospheric pressure, a rotary gas metering device connected in said second conduit structure intermediate said last-mentioned means and the reaction zone and coupled to said propeller shaft for operation thereby to advance reagent gas to the zone in predetermined volumetric proportion to the advance of air, relief means connected to the second conduit structure between the pressure reducing means and the metering device, and responsive to departure of the reagent gas from atmospheric pressure, for effecting communication between said conduit structure and the atmosphere, to prevent further departure of the pressure from atmospheric value, means providing a source of reagent liquid, means for advancing said reagent liquid to the reaction zone, said last-mentioned means comprising a receiving vessel, means for supplying liquid thereto from the source and for maintaining a constant level in said vessel, and rotary means disposed to dip into the liquid in said vessel and coupled to said propeller shaft for operation thereby, to transfer liquid to the reaction zone in a predetermined volumetric proportion to the advance of air.

6. Apparatus for preparing a gaseous product to be derived from a plurality of fluids, comprising, in combination, conduit structure extending from a source of constituent gas to a locality of gaseous product delivery, said conduit structure including inlet means receiving said constituent gas at substantially constant pressure, reaction chamber means in said structure providing a zone for preparation of the gaseous product, said preparation zone means having permeable fluid-impeding structure enclosed therein for facilitating reaction in producing said gaseous product, means for supplying another fluid to said preparation zone for reaction therein, volumetric metering means connected in said conduit structure between the said inlet means and the said zone and actuated by the advance of said constituent gas in accordance with the rate of flow of said constituent gas therethrough, for controlled drive of said last-mentioned fluid supplying means to maintain a predetermined proportionality between the said constituent gas and said other fluid such that the constituent gas constitutes a major component of the product, said conduit structure comprising a plurality of branch delivery conduits at the delivery locality, gas propelling means in each of said branch conduits for respectively applying suction in the branch conduits, said gas propelling means being constructed and arranged for and constituting the sole means for individually and collectively advancing the constituent gas by section from the source to the preparation zone and for advancing the gaseous product by suction from said zone to the delivery locality, said preparation zone means, said metering means and said conduit structure each having gas flow resistance and being collectively dimensioned with respect to said resistance to provide a total pressure drop between the inlet means and the branch conduits which has a predetermined maximum value when the flow of gaseous product in all the branch conduits is at the maximum of a predetermined range of gas flow in each branch conduit, and flow-resisting means in each of the branch conduits upstream of the propelling means, including a valve in each branch conduit adjustable to vary the gas flow therein through said range, said flow resisting means in each branch conduit being dimensioned to provide, in such branch, a pressure drop which for all positions of the corresponding valve, in its said range of adjustment, is greater than the aforesaid maximum value of pressure drop between the inlet means and the branch conduits, so that each valve is adapted, upon adjustment, to modify simultaneously the gas flow from the inlet means and the gaseous product flow in its own branch, without substantially altering the rates of gaseous product flow in the other branches.

7. The apparatus described in claim 6 wherein the flow-resisting means in each branch conduit comprises a fixed metering orifice and an adjustable orifice constituting the valve of the branch, in series in the path of gaseous product flow in the branch, the total resistance of said fixed orifice and of said adjustable orifice when opened to a position for the aforesaid maximum gas flow in the branch being sufficient to provide a pressure drop in the branch which is equal to more than twice the aforesaid maximum drop between the inlet means and the branches.

8. The apparatus described in claim 6 wherein the flow-resisting means in each branch provides a pressure drop when the valve in the branch is opened for the aforesaid maximum gaseous product flow in the branch, that is equal to at least about three times the aforesaid maximum pressure drop between the inlet means and the branches, and wherein the volumetric metering means is dimensioned, relative to its controlled drive of the other fluid-supplying means, for maintaining flow of said first-mentioned constituent gas in quantity to constitute said gas as at least 90% of the gaseous product.

9. The apparatus described in claim 6 wherein each of the propelling means is a gas-actuated aspirator, said aspirators in the branches having a common means for supplying streams of diluent gas thereto for actuation thereof.

10. The apparatus described in claim 6 wherein each of the flow-resisting means in the branches comprises a fixed metering orifice having manometer means connected to the branch on opposite sides of said orifice for indicating the gas flow, and an adjustable orifice constituting the valve of the branch, said orifices being arranged in series in each branch, and said adjustable orifice, when opened to a position for the aforesaid maximum gas flow in the branch, being dimensioned to provide a pressure drop substantially greater than the pressure drop across the fixed orifice at said maximum flow.

11. Apparatus for the controlled preparation, by chemical reaction, of a gaseous treating agent which is delivered, for treatment purposes, as a non-hazardous gaseous product of uniform composition containing a major proportion of inert diluent gas, comprising, in combination, a conduit extending from an inlet at a source of said diluent gas at a pressure at least as low as atmospheric to an outlet for delivery of the gaseous product, means in the conduit at a place remote from the inlet for applying suction in the conduit to advance gas along the conduit from inlet to outlet, said suction means constituting the sole means for advancing gas into and along the conduit, reaction chamber means in the conduit between the inlet and the suction means to provide a reaction zone for preparation of the treating agent, metering means adapted to be mechanically operated at a controlled speed, for supplying reactant fluid material to the chamber means only when mechanically operated and only at a rate governed by the speed of operation, said metering means comprising rotatable structure chambered to hold and carry discrete, measured quantities of reactant fluid, means supplying fluid to said rotatable structure at one locality of its path of rotation, and means at another locality of said path for conducting fluid from said rotatable structure to the reaction chamber means, and liquid-sealed, gas-operated metering means embodied in the conduit between the inlet and the chamber means and including volumetric gas-transferring wheel means chambered to transfer successive, discrete, measured quantities of diluent gas across said liquid seal from the conduit inlet to the reaction chamber means, said wheel means being rotated only by withdrawal of diluent gas from said wheel means by the suction means, said gas-transferring means being mechanically coupled to the first-mentioned metering means for driving the latter only when diluent gas is advanced along the conduit and only at a speed proportioned to the rate of advance of said diluent gas.

12. Apparatus as described in claim 11 in which the first-mentioned metering means for supplying reactant fluid material comprises a wet-type gas metering device having an intake for reactant gas, an outlet to said zone, a vessel partially filled with liquid to provide a liquid seal against direct transfer of gas between intake and outlet of the device and a rotatable, chambered drum partially submerged in said liquid for transferring successive quantities of reactant gas from the intake to the outlet of the device whenever the drum is rotated and only at a rate proportioned to the rate of rotation, said drum being coupled to the aforesaid second-mentioned gas-operated metering means to be driven thereby, the inlet of the aforesaid conduit being arranged to open to the atmosphere to receive air as the aforesaid diluent gas at atmospheric pressure, the intake for the aforesaid metering device comprising means receiving the said reactant gas at approximately atmospheric pressure, and said gas-operated metering means and said gas metering device being respectively dimensioned and proportioned to constitute the advanced diluent air a component of large preponderance, by volume, in the gaseous product advanced from the chamber means by the suction means.

13. Apparatus as described in claim 12 in which the metering means for supplying reactant fluid also includes a second metering device to be supplied with reactant liquid and having an outlet conduit to discharge said liquid to said reaction zone, said second metering device comprising a rotatable structure for transferring successive discrete quantities of liquid into said outlet conduit whenever said rotatable structure is rotated and at a rate proportional to the speed of rotation, said rotatable structure being constructed and arranged to prevent transfer of liquid unless the structure is rotated, and said rotatable structure being coupled to the aforesaid second-mentioned gas-operated metering means to be driven thereby.

14. Apparatus as described in claim 11 in which the first-mentioned metering means for supplying reactant fluid material comprises a plurality of metering devices respectively connected to supply different reactant fluids to the reaction zone, each of said metering devices having an outlet conduit to said zone and each of said devices comprising a rotatable structure for transferring successive discrete quantities of fluid into the outlet conduit whenever the rotatable structure is rotated and at a rate proportional to the speed of rotation, each of said rotatable structures being constructed and arranged to prevent transfer of fluid unless the structure is rotated, and said structures being coupled to the aforesaid second-mentioned gas-operated metering means to be driven thereby.

15. Apparatus for the controlled preparation, by chemical reaction, of a gaseous treating agent which is delivered, for treatment purposes, as a non-hazardous gaseous product of uniform composition containing a major proportion of inert diluent gas, comprising, in combination, a conduit extending from an inlet at a source of said diluent gas at a pressure at least as low as atmospheric to an outlet for delivery of the gaseous product, suction means in the conduit at a place remote from the inlet for applying a pressure drop along the conduit to advance gas from the inlet, chamber means in the conduit between the inlet and the suction means to provide a reaction zone for preparation of the treating agent, means for supplying reactant fluid material to the chamber means, said supply means including a liquid-sealed, gas metering device which comprises a volumetric, rotatable, gas-transferring wheel connected to transfer reactant gas from a source to the chamber means only at a rate governed by the speed of rotation of said wheel, and a second liquid-sealed gas-operated metering means embodied in the conduit between the inlet and the chamber means and including a volumetric gas-transferring wheel for carrying successive, discrete volumes of diluent gas, said second wheel being rotated only by the advance of diluent gas by the suction means, and said second wheel being coupled to the first-mentioned wheel of the reactant-gas metering device for driving the latter only when diluent gas is advanced along the conduit and only at a speed proportioned to the rate of advance of said diluent gas.

16. Apparatus as described in claim 15 in which the aforesaid supply means also includes a metering device for advancing reactant liquid, said liquid metering device comprising an outlet conduit to the reaction zone, and a cyclically operable structure for advancing successive, discrete volumes of liquid into said outlet conduit whenever said structure is driven, said structure being coupled to the aforesaid second wheel of the gas-operated metering means to be driven thereby and said structure being constructed and arranged to advance liquid only when it is driven.

17. Apparatus for the controlled preparation, by chemical reaction, of a gaseous treating agent which is delivered, for treatment purposes, as a non-hazardous gaseous product of uniform composition containing a major proportion of inert diluent gas, comprising, in combination, a conduit extending from an inlet at a source of said diluent gas at a pressure at least as low as atmospheric to an outlet for delivery of the gaseous product, suction means in the conduit at a place remote from the inlet for applying a pressure drop along the conduit to advance gas from the inlet, chamber means in the conduit between the inlet and the suction means to provide a reaction zone for preparation of the treating agent, means for supplying reactant fluid material to the chamber means, said fluid supply means including a vessel for holding a body of reactant liquid, a rotatable member having an apertured peripheral region and arranged to dip into the liquid in the said holding vessel and to turn its periphery out of said liquid for elevating successive quantities of liquid from the body thereof in its apertured region, and means including conduit structure extending to said chamber means for withdrawing the successive, elevated quantities of liquid from the rotatable member, said rotatable member delivering reactant liquid to the chamber means only at a rate proportioned to the speed of rotation thereof, and liquid-sealed, gas-operated metering means embodied in the conduit between the inlet and the chamber means and including a volumetric gas-transferring wheel rotated only by the advance of diluent gas by the suction means, said gas-transferring wheel being coupled to the rotatable member for driving the latter only when diluent gas is advanced along the conduit and only at a speed proportioned to the rate of advance of said diluent gas.

18. In apparatus for the controlled preparation, by chemical reaction, of a gaseous treating agent which is delivered, for treatment purposes, as a non-hazardous gaseous product of uniform composition containing a major proportion of inert diluent gas, in combination, a conduit extending from an inlet at a source of said diluent gas to an outlet for delivery of the gaseous product, gas-propelling means connected with the conduit for advancing diluent gas from the inlet, and to the outlet with the treating agent gas, chamber means in the conduit between the inlet and the outlet to provide a reaction zone for preparation of the treating agent gas, metering means adapted to be mechanically operated at a controlled speed, for supplying a reactant liquid to the chamber means at a rate governed by the speed of operation, and liquid-sealed, gas-operated metering means embodied in the conduit between the inlet and the chamber means and including volumetric gas-transferring means rotated only by the advance of diluent gas by said gas-propelling means, said gas-transferring means being coupled to the first-mentioned metering means for driving the latter only when diluent gas is advanced along the conduit and only at a speed proportioned to the rate of advance of said diluent gas, said first-mentioned metering means comprising an outlet conduit to the reaction zone and a cyclically operable structure for advancing successive, discrete volumes of liquid into said outlet conduit whenever said structure is driven, said structure being coupled to be driven by the gas-transferring means as aforesaid and said structure being constructed and arranged to advance liquid only when it is driven.

19. Apparatus for preparing a gaseous product from a plurality of fluids, of which one is a gas and another a liquid, comprising, in combination, an enclosure structure providing a main reaction chamber therewithin, an enclosure structure providing a supplemental chamber located at such level in respect to said main reaction chamber that a liquid may flow by gravity from the bottom of said supplemental chamber to the top portion of said main reaction chamber, means for supplying liquid to said supplemental chamber, means for supplying gas to said main reaction chamber, and conduit means connected from the lower portion of said supplemental chamber to the upper portion of said main reaction chamber and constituting the sole communicating means for fluid between said chambers, said conduit means including a trap formed by two arms of said conduit means connected at their lower portions and each of said arms having a vertical component, one of said arms being open to the interior of said main reaction chamber, said arms being in part filled with some of said liquid when said apparatus is in use, whereby the gaseous pressure in said supplemental chamber may be maintained at a predetermined value ($p_1$), and the gaseous pressure in said main reaction chamber may be maintained at an independently predetermined value ($p_2$), and said liquid in said trap may extend upwardly in said arms to a differential extent, equivalent to $p_1 - p_2$.

20. Apparatus in accordance with claim 19, in which said means for supplying gas to said main reaction chamber comprises controllable gas-advancing means connected to said main reaction chamber, said controllable gas-advancing means being effective to maintain a gaseous pressure ($p_2$) in said main reaction chamber; and in which said means for supplying liquid to said supplemental chamber comprises gas-propelling means communicating with said supplemental chamber for advancing liquid to said supplemental chamber under gas at a pressure ($p_1$) different from the pressure ($p_2$) in said main reaction chamber.

References Cited in the file of this patent

UNITED STATES PATENTS

| Number | Name | Date |
|---|---|---|
| 378,326 | Lewis | Feb. 21, 1888 |
| 391,865 | Schutte | Oct. 30, 1888 |
| 537,384 | Cook | Apr. 9, 1895 |
| 583,818 | Redmon | June 1, 1897 |
| 1,882,795 | Foersterling | Oct. 18, 1932 |
| 2,010,507 | Church et al. | Aug. 6, 1935 |
| 2,367,153 | Swinehart et al. | Jan. 9, 1945 |
| 2,451,826 | Haller | Oct. 19, 1948 |
| 2,459,124 | Booth | Jan. 11, 1949 |
| 2,610,908 | De Prez et al. | Sept. 16, 1952 |